(12) United States Patent
Zeng et al.

(10) Patent No.: US 8,861,829 B2
(45) Date of Patent: Oct. 14, 2014

(54) METHOD AND SYSTEM FOR RECONSTRUCTION OF TOMOGRAPHIC IMAGES

(75) Inventors: Kai Zeng, Clifton Park, NY (US); Jed Douglas Pack, Glenville, NY (US); Kyle Morgan Champley, Scotia, NY (US); Bruno Kristiaan Bernard De Man, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 81 days.

(21) Appl. No.: 13/250,753

(22) Filed: Sep. 30, 2011

(65) Prior Publication Data

US 2013/0083986 A1    Apr. 4, 2013

(51) Int. Cl.
*G06K 9/00* (2006.01)
*G06T 11/00* (2006.01)
*G06K 9/46* (2006.01)

(52) U.S. Cl.
CPC ............... *G06K 9/46* (2013.01); *G06T 11/003* (2013.01)
USPC ........................................................ 382/132

(58) Field of Classification Search
CPC .................................................... G06T 11/003
See application file for complete search history.

(56) References Cited

U.S. PATENT DOCUMENTS

| | | | |
|---|---|---|---|
| 5,625,660 A | 4/1997 | Tuy | |
| 6,148,056 A | 11/2000 | Lin et al. | |
| 6,490,333 B1 | 12/2002 | Hsieh | |
| 6,504,892 B1 | 1/2003 | Ning | |
| 6,839,400 B2 | 1/2005 | Bruder et al. | |
| 6,983,034 B2 | 1/2006 | Wang et al. | |
| 6,990,167 B2 | 1/2006 | Chen | |
| 7,245,755 B1 | 7/2007 | Pan et al. | |
| 7,359,478 B2 | 4/2008 | Zamyatin et al. | |
| 7,409,033 B2 | 8/2008 | Zhu et al. | |
| 7,643,605 B2 | 1/2010 | Ning et al. | |
| 7,751,524 B2 | 7/2010 | Horiuchi et al. | |
| 7,848,479 B1 | 12/2010 | Katsevich | |
| 2006/0104407 A1 | 5/2006 | Zamyatin et al. | |
| 2006/0104409 A1 | 5/2006 | Bouman et al. | |
| 2006/0291611 A1 | 12/2006 | Pack et al. | |
| 2007/0274582 A1* | 11/2007 | Yatziv et al. | 382/131 |

(Continued)

FOREIGN PATENT DOCUMENTS

| | | |
|---|---|---|
| DE | 102009014727 A1 | 9/2010 |
| WO | 03015634 A1 | 2/2003 |

(Continued)

OTHER PUBLICATIONS

Kennedy, John A., et al. "Super-resolution in PET imaging." Medical Imaging, IEEE Transactions on 25.2 (2006): 137-147.*

(Continued)

*Primary Examiner* — Bhavesh Mehta
*Assistant Examiner* — Andrew Moyer
(74) *Attorney, Agent, or Firm* — Fletcher Yoder, P.C.

(57) ABSTRACT

Approaches are described for processing half-scan or full-scan cone beam image data using one or more half-ramp filtering operations. In one embodiment, the half-ramp filtering operations allow extraction and use of missing frequency data so as to generate a reconstructed image that is relatively complete in terms of frequency data and which has suitable temporal resolution. In addition, in certain embodiments, the reconstructed image may have uniform frequency weighting.

16 Claims, 15 Drawing Sheets

(56) References Cited

U.S. PATENT DOCUMENTS

| | | |
|---|---|---|
| 2009/0028288 A1 | 1/2009 | Horiuchi et al. |
| 2010/0135454 A1 | 6/2010 | Noo |
| 2010/0158194 A1 | 6/2010 | Pack et al. |
| 2010/0177862 A1 | 7/2010 | Bruder et al. |
| 2011/0033097 A1 | 2/2011 | Bruder et al. |
| 2011/0103662 A1 | 5/2011 | Chiang et al. |

FOREIGN PATENT DOCUMENTS

| | | |
|---|---|---|
| WO | 03094736 A1 | 11/2003 |
| WO | 2004070661 A1 | 8/2004 |
| WO | 2006073584 A2 | 7/2006 |
| WO | 2006085242 A1 | 8/2006 |
| WO | 2006012061 A1 | 11/2006 |

OTHER PUBLICATIONS

Zeng, Gengsheng L. "Nonuniform noise propagation by using the ramp filter in fan-beam computed tomography." Medical Imaging, IEEE Transactions on 23.6 (2004): 690-695.*

Burrell, Steven, and Anita MacDonald. "Artifacts and pitfalls in myocardial perfusion imaging." Journal of nuclear medicine technology 34.4 (2006): 193-211.*

Reddy, B. Srinivasa, and Biswanath N. Chatterji. "An FFT-based technique for translation, rotation, and scale-invariant image registration." Image Processing, IEEE Transactions on 5.8 (1996): 1266-1271.*

Pannu, Harpreet K., Pamela T. Johnson, and Elliot K. Fishman. "64 Slice multi-detector row cardiac CT." Emergency radiology 16.1 (2009): 1-10.*

Park, Sung Cheol, Min Kyu Park, and Moon Gi Kang. "Super-resolution image reconstruction: a technical overview." Signal Processing Magazine, IEEE 20.3 (2003): 21-36.*

Kachelrieb M., et al.; "Extended parallel backprojection for standard three-dimensionai and phase-correlated four dimensional axial and spiral cone-beam CT with arbitrary pitch, arbitrary cone-angle, and 100% dose usage", Medical Physics, vol. 31, No. 6, pp. 1623-1641, May 27, 2004.

Lee, Seung Wook, et al.; "Grangeat-type helical half-scan computerized tomography algorithm for reconstruction of a short object", Med. Phys. 31(1), Jan. 2004, pp. 4-16.

Lu, Yang, et al.; "Exact image reconstruction with triple-source saddle-curve cone-beam scanning", Physics in Medicine and Biology, vol. 54, pp. 2971-2991 (2009).

U.S. Appl. No. 13/149,698, filed May 31, 2011, Benson et al.
U.S. Appl. No. 13/149,702, filed May 31, 2011, Pack et al.
U.S. Appl. No. 13/149,732, filed May 31, 2011, Zeng et al.
U.S. Appl. No. 13/149,734, filed May 31, 2011, Pack et al.

Zhye Yin et al., "3D Analytic Cone-Beam Reconstruction for Muitiaxial CT Acquisitions", International Journai of Bio Medical Imagina, vol. 2009, Article ID 538389, 11 pages, Aug. 2009.

Kai Zeng et al., "A Half-Scan Error Reduction Based Algorithm for Cone-Beam CT", Journal of X-Ray Science and Technology, pp. 73-82, Jul. 2004.

Brian E. Nett et al., "Arc Based Cone-Beam Reconstruction Algorithm Using an Equal Weighting Scheme", Journal of X-Ray Science and Technology, pp. 19-48, vol. 15, No. 1 /2007, Mar. 2007.

Jicun Hu et al., "An Approximate Short Scan Helical FDK Cone Beam Algorithm Based on Nutating Curved Surfaces Satisfying the Tuy's Condition", The International Journal of Medical Physics Research and Practice, vol. 32, Issue 6, 2005.

* cited by examiner

| Projection range assuming $\varphi_0 = 0$ | $\mathcal{P}^* \Lambda g$ | $- H_\Theta \mathcal{P}^* \partial g$ | $\mathcal{P}^* \Lambda g - H_\Theta \mathcal{P}^* \partial g$ |
|---|---|---|---|
| $|\varphi - \varphi_0| < \frac{\pi}{2}$ | top:1, mid:0,0,2, bot:1 | top:1, mid:0,0,0, bot:1 | top:2, mid:0,0,2, bot:2 |
| $|\varphi - \varphi_0| > \frac{\pi}{2}$ | top:1, mid:2,0,0, bot:1 | top:-1, mid:0,0,0, bot:-1 | top:0, mid:2,0,0, bot:0 |
| $\varphi \in [-\pi, \pi)$ | top:2, mid:2,0,2, bot:2 | top:0, mid:0,0,0, bot:0 | top:2, mid:2,0,2, bot:2 |

FIG. 11

METHOD AND SYSTEM FOR RECONSTRUCTION OF TOMOGRAPHIC IMAGES

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of X-rays through the target volume, to acquire image data and to construct tomographic images (e.g., three-dimensional representations of the interior of the human body or of other imaged structures). However, various physical limitations or constraints on acquisition may result in artifacts or other imperfections in the reconstructed image.

For example, third-generation cone-beam CT may suffer from cone-beam artifacts, due to incompleteness of the scan data at certain locations, such as at the edges of the cone. For example, these artifacts may arise from a variety of causes, such as truncation of data in the Z-direction (i.e., in the direction corresponding to the axis about which the X-ray source rotates about the patient), mishandled data, and/or missing frequencies.

BRIEF DESCRIPTION

In one embodiment, a method of tomographic image reconstruction is provided. The method includes applying a first half-ramp filter to a set of full-scan cone-beam projection data to generate a first set of filtered projections. The first set of filtered projections is reconstructed to generate a first half-ramp image. A second half-ramp image is generated. Complementary frequency data is extracted from the first half-ramp image and the second half-ramp image. A reconstructed image is generated using the extracted complementary frequency data. Corresponding computer-readable media and system embodiments are also provided.

In an additional embodiment, a method of tomographic image reconstruction is provided. The method includes applying a full-ramp filter to a set of full-scan projection data to generate a set of ramp filtered projections. The set of ramp filtered projections is reconstructed to generate a full-scan image. A derivative filter is applied to the set of full-scan projection data to generate a set of derivative filtered projections. The set of derivative filtered projections are reconstructed to generate a delta image. The full-scan image and the delta image are combined to generate a reconstructed image.

In another embodiment, a method of tomographic image reconstruction is provided. The method includes applying a first half-ramp filter to a set of cone-beam projection data acquired over less than a full-scan to generate a first set of filtered projections and reconstructing the first set of filtered projections to generate a first half-ramp image. The method also comprises generating a second set of filtered projections based on the set of cone-beam projection data and the first set of filtered projections and reconstructing the second set of filtered projections to generate a second half-ramp image. The first half-ramp filter is applied to the first half-ramp image to generate a third half-ramp image and a second half-ramp filter is applied to the second half-ramp image to generate a fourth half-ramp image. A reconstructed image is generated by combining the third half-ramp image and the fourth half-ramp image. Corresponding computer-readable media and system embodiments are also provided.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein:

FIG. 11 depicts a graphical representation of frequency space weights for use in reconstruction of a full-scan of projection data in accordance with aspects of the present disclosure;

DETAILED DESCRIPTION

Embodiments disclosed herein provide algorithms for the reconstruction of images from data collected using conebeam computed tomography (CT). The algorithms address artifacts attributable to one or more of truncation of data in the z-direction, mishandled data due to incorrect data redundancy weighting, and/or missing frequency data. In accordance with certain embodiments, approaches are described for generating image reconstructions using half-ramp filters.

For example, in a full-scan implementation, the full-scan image data may be acquired. A first half-ramp image may be generated by filtering the full-scan image data using a first half-ramp filter and a second half-ramp image may be generated by filtering the full-scan image data using a second half-ramp filter, such as a half-ramp filter that is complementary to the first half-ramp filter. Frequencies from both half-ramp images may be extracted, such as by a two-dimensional fast Fourier transform (FFT), and combined into a new scan having a specified center view and having a temporal resolution associated with a half-scan (i.e., having a higher temporal resolution than a full-scan).

In other implementations, a half-scan of image data may be initially acquired and processed using half-ramp filter operations, as discussed herein. In these implementations, suitable weighting in Fourier space is achieved by selecting half of the frequency range in each projection. For example, by applying a half-ramp filter in the projection domain, a specific weighting pattern is achieved after backprojection. By combining these reconstructions, a substantially uniform sampling of the entire Fourier space may be achieved, such as by performing another half-ramp filtration on the reconstructed images to generate a uniformly weighted reconstruction.

The approaches disclosed herein may be suitable for use with a range of tomographic reconstruction systems. To facilitate explanation, the present disclosure will primarily discuss the present reconstruction approaches in the context of a CT system. However, it should be understood that the following discussion may also be applicable to other tomographic reconstruction systems.

Figure 1:
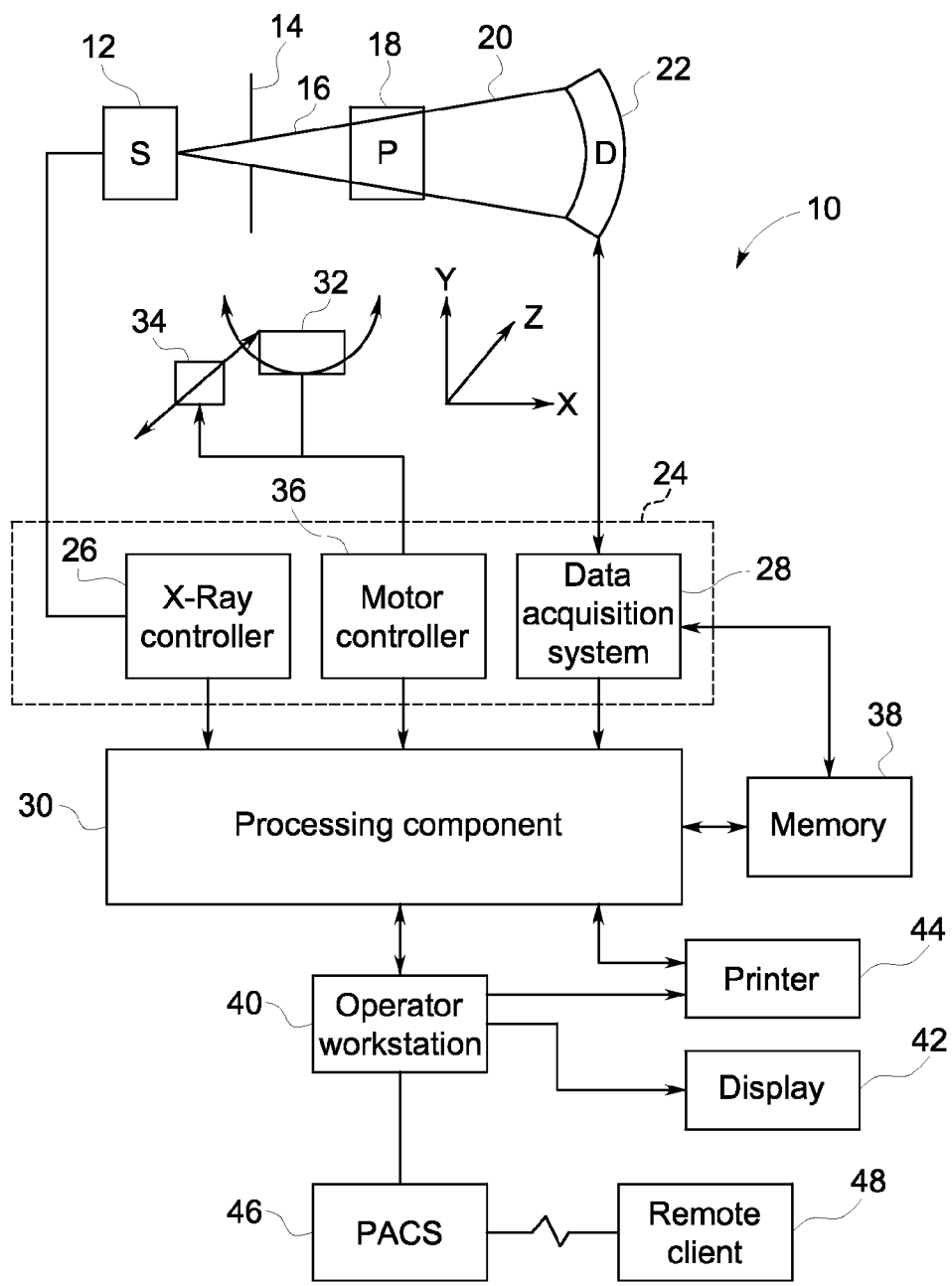
FIG. 1 is a diagrammatical view of a CT imaging system for use in producing images in accordance with aspects of the present disclosure.

With this in mind, an example of a computer tomography (CT) imaging system 10 designed to acquire X-ray attenuation data at a variety of views around a patient and suitable for tomographic reconstruction is provided in FIG. 1. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated to be a cone-shaped beam, i.e., a cone-beam, that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x, y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at a variety of views relative to the subject. In the present context, system controller 24 may also includes signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

As noted above, the reconstruction of images from data acquired by an imaging system, such as the depicted CT imaging system 10, may be subject to various limitations that may result in artifacts or other imperfections in the generated images. For example, the acquired data may be truncated in the z-direction in certain acquisition scenarios. In particular, in an axial (i.e., circular) cone-beam acquisition, certain of the voxels in the image volume will always be in the X-ray beam during the axial spin (such as those voxels near the mid-plane i.e., plane in which the X-ray focal spot moves) while other voxels are illuminated in certain of the views during the axial spin but not in others. For example, due to the narrow portion of the X-ray cone being closer to the X-ray source 12, (that is, the cone expands or diverges as distance from the source increases) a narrow segment of voxels near the X-ray 12 source may be illuminated while those voxels furthest from the source are fully or mostly illuminated due to being near the wide base of the cone. However, as the X-ray source is rotated axially about the volume, the portions of the volume that are near and far from the X-ray source 12 will also rotate, with the result being that the extent of X-ray illumination a voxel receives may decay monotonically with distance of the voxel from the mid-plane of focal spot rotation. As a result, there is less data available with respect to the edges of the X-ray cone in the z-direction in an axial scan than for those voxels nearer the mid-plane of the cone in the z-direction. This data truncation in the z-direction may prevent the reconstruction of good quality images outside that portion of the volume which is always projected onto the detector during an axial scan.

In the case of mishandled data, any given voxel will be seen by the source and detector for a certain angular view range in a given cone-beam axial scan. However, some Radon directions or frequencies will be measured twice in such a scan. The reconstruction should correctly take into account this redundancy or artifacts may result. Simple weighting in the sinogram domain may not always meet this goal accurately and therefore more advanced filtering techniques may be useful. In certain instances, mishandled data as described herein may result in cone-beam artifacts in the reconstructed image.

In addition, in some instances where a cone-beam axial scan is employed, certain frequency information may be missing for a given voxel. For example, even inside the 360 degree region generated by a circular (i.e., axial) scan, there may be some missing frequencies, particularly along the z-direction. The amount of missing frequencies will increase with distance from the mid-plane (plane in which the x-ray focal spot moves).

Figure 2:
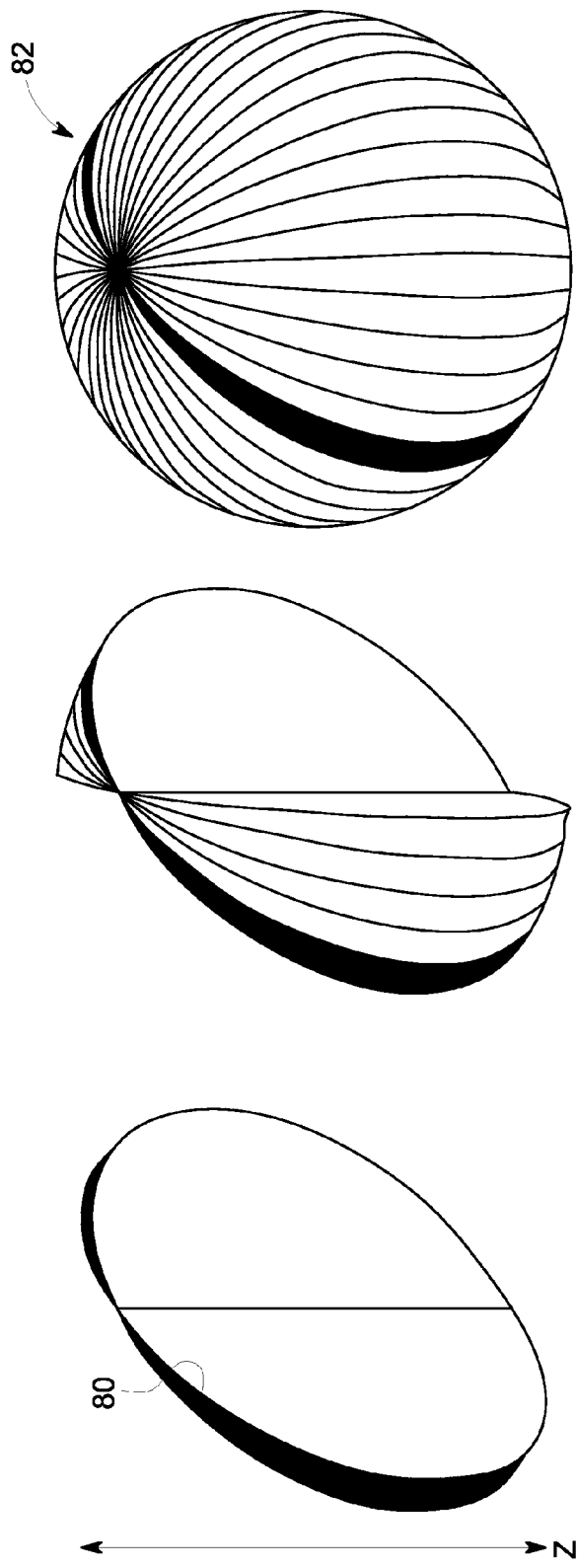
FIG. 2 depicts the sweep of a circle in frequency space to define a spherical shell.

Some or all of the above-noted issues are addressed by the approaches discussed herein. By way of introducing certain aspects of these approaches, a brief discussion of frequency analysis is provided. For example, turning to FIGS. 2-4, aspects of frequency analysis are discussed that may prove useful to understanding the present approach. In particular, in cone-beam tomography each measured (and filtered) ray contributes 3D Radon (or Fourier) information (hereafter called frequency information) in a great circle (or disk in the Fourier case) that is orthogonal to the ray. In order to get an exact reconstruction at a particular voxel, filtered rays are accumulated whose frequency contributions cover the frequency sphere uniformly. If a ray has cone angle zero, its corresponding great circle in frequency space is parallel to the z (frequency) direction. Such is the case for points that lie in the plane of the source trajectory (the scan plane). Thus, in order to get an exact reconstruction at a particular voxel in the scan plane, filtered rays should be accumulated that pass through the voxel over a 180 degree range. This can be appreciated by noting that the vertical (parallel to z) circle 80 depicted will sweep out an entire spherical shell 82 as it is rotated 180 degrees, as shown in FIG. 2.

Figure 3:
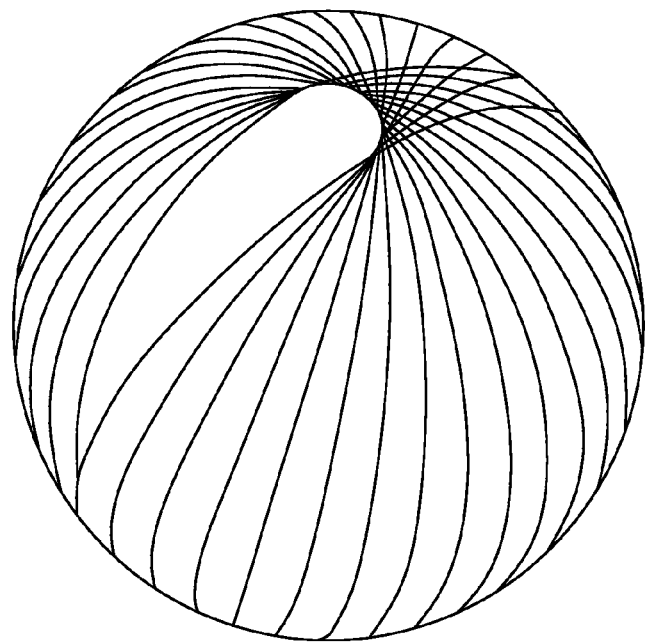
FIG. 3 depicts a region swept out by a circle in frequency space over a 180 degree range for a point outside the scan plane such that frequencies are missing.
Figure 4:
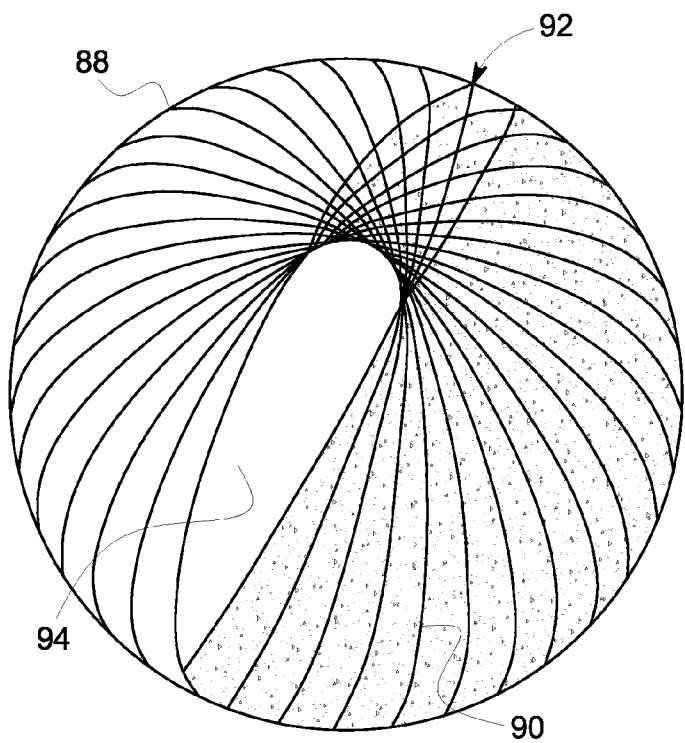
FIG. 4 depicts an alternative view of a region swept out by a circle in frequency space over a 180 degree range for a point outside the scan plane such that frequencies are missing.

For points that lie outside the scan plane, the great circle 80 is tilted off of the z-axis by the cone angle. If such data is used over a 180 degree range, the result appears as depicted in FIGS. 3 and 4. In FIG. 4, the region swept out by the two halves of each great circle is depicted with different hatching (first hatching 88 and second hatching 90) to facilitate visualization. There is a region of the sphere that is covered twice (combined hatching 92) and another region that is not covered at all (missing frequency information 94).

With the foregoing background in mind, the present approaches use various implementations of half-ramp filters that are used in the context of a full-scan (i.e., a 360° acquisition) of image data or of less than a full scan but equal to or larger than a half-scan (i.e., a 180°+α (the fan or cone angle of the X-ray beam)) of image data, typically acquired in a cone-beam imaging context. With respect to these implementations, the following equations and mathematical notations are provided to facilitate subsequent explanation and discussion of the various implementations. For example, The X-ray transform and its adjoint are given by:

$$Pf(y,r) = \int f(y+rt)dt, \text{ and} \quad (1)$$

$$P^*g(x) = \int g(x,r)dr \quad (2)$$

where $Pf(\bullet, r)$ is referred to as a "projection" and $P^*$ is known as the backprojection operator. The Fourier transform may be given by:

$$\mathfrak{F}f(\xi) = \int f(x)e^{-2\pi i x \bullet \xi}dx \quad (3)$$

In addition, the one-dimensional and directional Hilbert transforms are given, respectively, by:

$$Hf(s) = \frac{1}{\pi} \int \frac{f(t)}{s-t} dt, \quad (4)$$

and $$H_\Theta f(x) = \frac{1}{\pi} \int \frac{f(x-t\Theta)}{t} dt. \quad (5)$$

With this in mind, the ramp operator itself is given by:

$$\Lambda f(t) = \int_{\mathfrak{R}} |\sigma| \mathfrak{F}f(\sigma)e^{2\pi i t \sigma} d\sigma. \quad (6)$$

The derivative operator may be denoted by $\partial$ while the identity operator may be denoted by I. In view of the above statement of the ramp operator, the left- and right-side ramp operators (i.e., complementary half-ramp operators) are given by:

$$\Lambda_L f(t) = \int_{-\infty}^{0} |\sigma| \mathfrak{F}f(\sigma)e^{2\pi i t \sigma} d\sigma, \quad (7)$$

and $$\Lambda_R f(t) = \int_{0}^{\infty} |\sigma| \mathfrak{F}f(\sigma)e^{2\pi i t \sigma} d\sigma \quad (8)$$

where $\Lambda = \Lambda_L + \Lambda_R$, $\Lambda = H\partial = \partial H$, $\Lambda_L = \frac{1}{2}(\Lambda - i\partial)$, and $\Lambda R = \frac{1}{2}(\Lambda + i\partial)$.

Based on the foregoing mathematical notation, one embodiment of a present approach for processing a full-scan of acquired image data may be algorithmically represented by:

$$f_d = \frac{1}{2}(I + iH_\Theta)P * \Lambda_R g + \frac{1}{2}(I - iH_\Theta)P * \Lambda_L g \quad (9)$$

where $f_d$ is the reconstructed image, f is the true image, and g=Pf denotes the measured projections. As discussed in greater detail below, in an implementation where the center view projection vector is given by $(-\cos(\phi_0), -\sin(\phi_0), 0)^T$, then $\Theta$ in equation (9) may be defined by $\Theta(\phi_0) = (-\sin(\phi_0), \cos(\phi_0), 0)^T$. In other implementations, the value of $\Theta$ may be determined based on the view projection vector employed.

Figure 5:
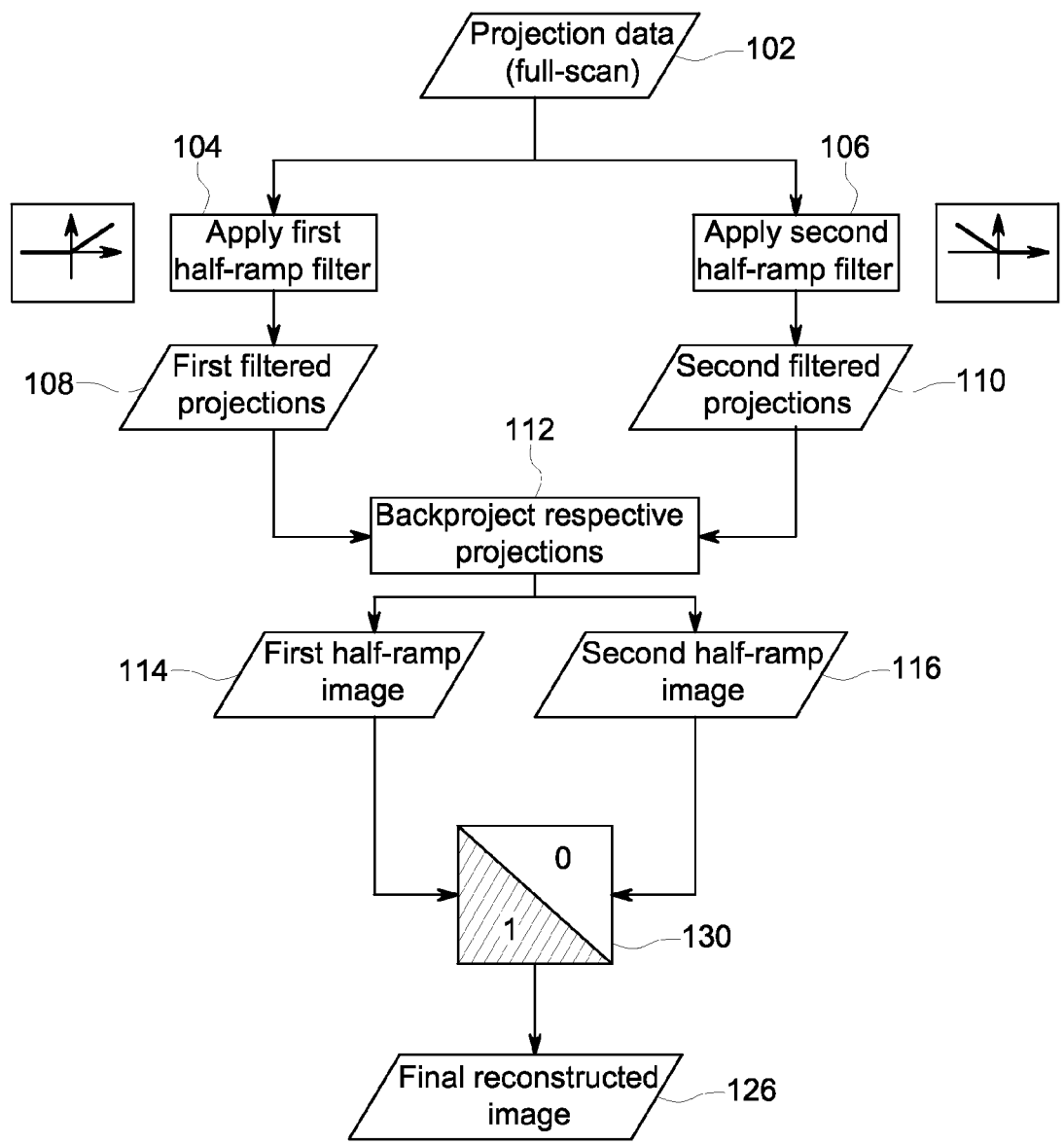
FIG. 5 depicts a flowchart of algorithmic steps for reconstructing a full-scan of projection data in accordance with aspects of the present disclosure.

For example, in one generalized example, a full-scan of image data is acquired using a cone-beam imaging system and processed using the half-ramp operators given above by equations (7) and (8). In particular, referring now to FIG. 5, a flowchart 100 is provided that depicts a generalized implementation of one approach in which a set of projection data 102 acquired during a full scan protocol (i.e., a 360° rotation acquisition). In the depicted approach, first and second complementary half-ramp filters (e.g., left and right half-ramp filters) are each applied (blocks 104, 106) to the full-scan projection data 102 to generate a first set of filtered projections 108 generated by application of the first half-ramp filter (e.g., a left half-ramp filter) and a second set of filtered projections 110 generated by application of the second half-ramp filter (e.g., a right half-ramp filter).

In the depicted implementation, the respective sets of filtered projections 108, 110 are backprojected (block 112) to generate a respective first half-ramp image 114 and a respective second half-ramp image 116. A fast Fourier transform may be performed and used to extract complementary sets of frequencies that, when combined provide a final reconstructed image 126 having a specified center view and having a temporal resolution consistent with a half-scan image acquisition, as compared to a full-scan acquisition. Effectively, these same functions may be performed using a filter 130 that effectively processes each half-ramp image 114, 116 so as to select or weight complementary portions of the images for combination into the final reconstructed image 126.

Figure 6:
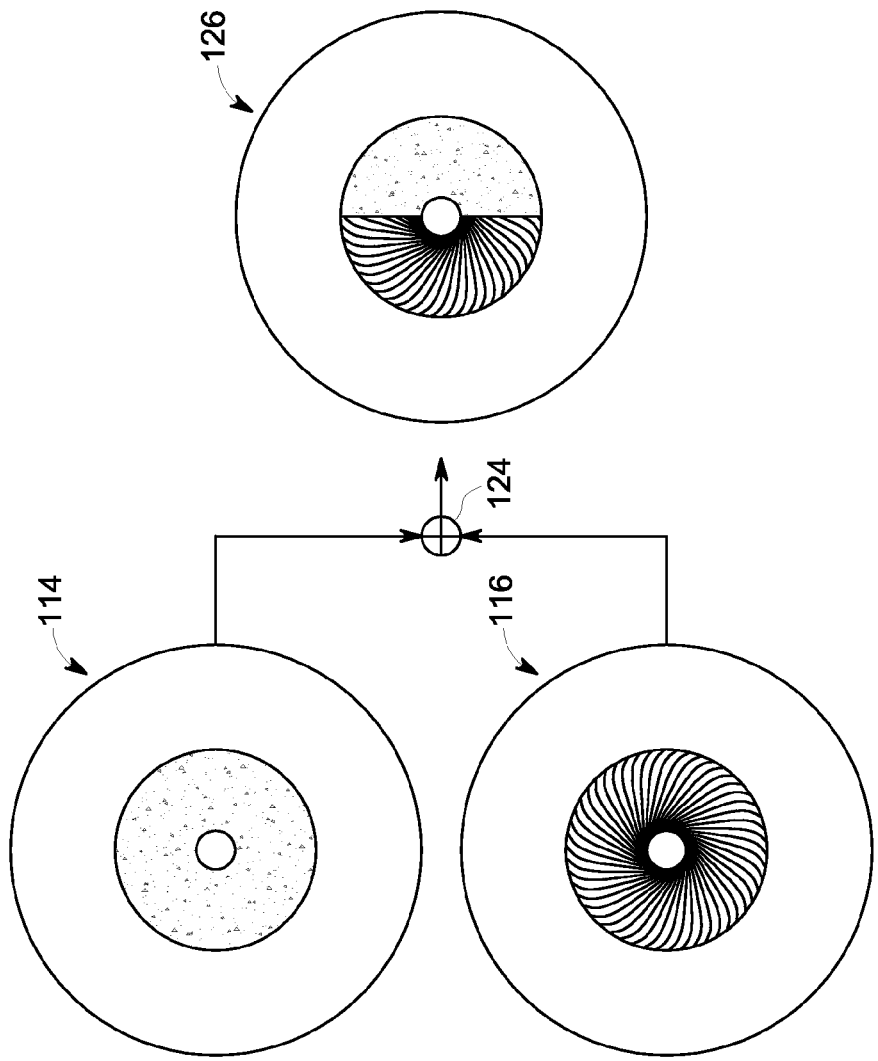
FIG. 6 depicts a graphical representation of the combination of two half-ramp reconstructions in accordance with aspects of the present disclosure.

Turning to FIG. 6, aspects of this process are depicted graphically. For example, a first half-ramp image 114 (here the image generated by processing projection data 102 using a right half-ramp filter) and a second half-ramp image 116 (here the image generated by processing projection data 102 using a left half-ramp filter) are depicted in Fourier space. Extracted frequencies of each half-ramp image 114, 116 corresponding to respective left and right half-scans are combined (block 124) to generate the final reconstructed image 126 using the extracted frequencies. In certain implementations, the described algorithm selects the best view to supplement or fill in the frequency information in Fourier domain to achieve suitable temporal resolution, such as temporal resolution typically associated with half-scan imaging protocols. Further, all the data is handled correctly in Fourier domain, which reduces or eliminates cone-beam artifacts.

Figure 7:
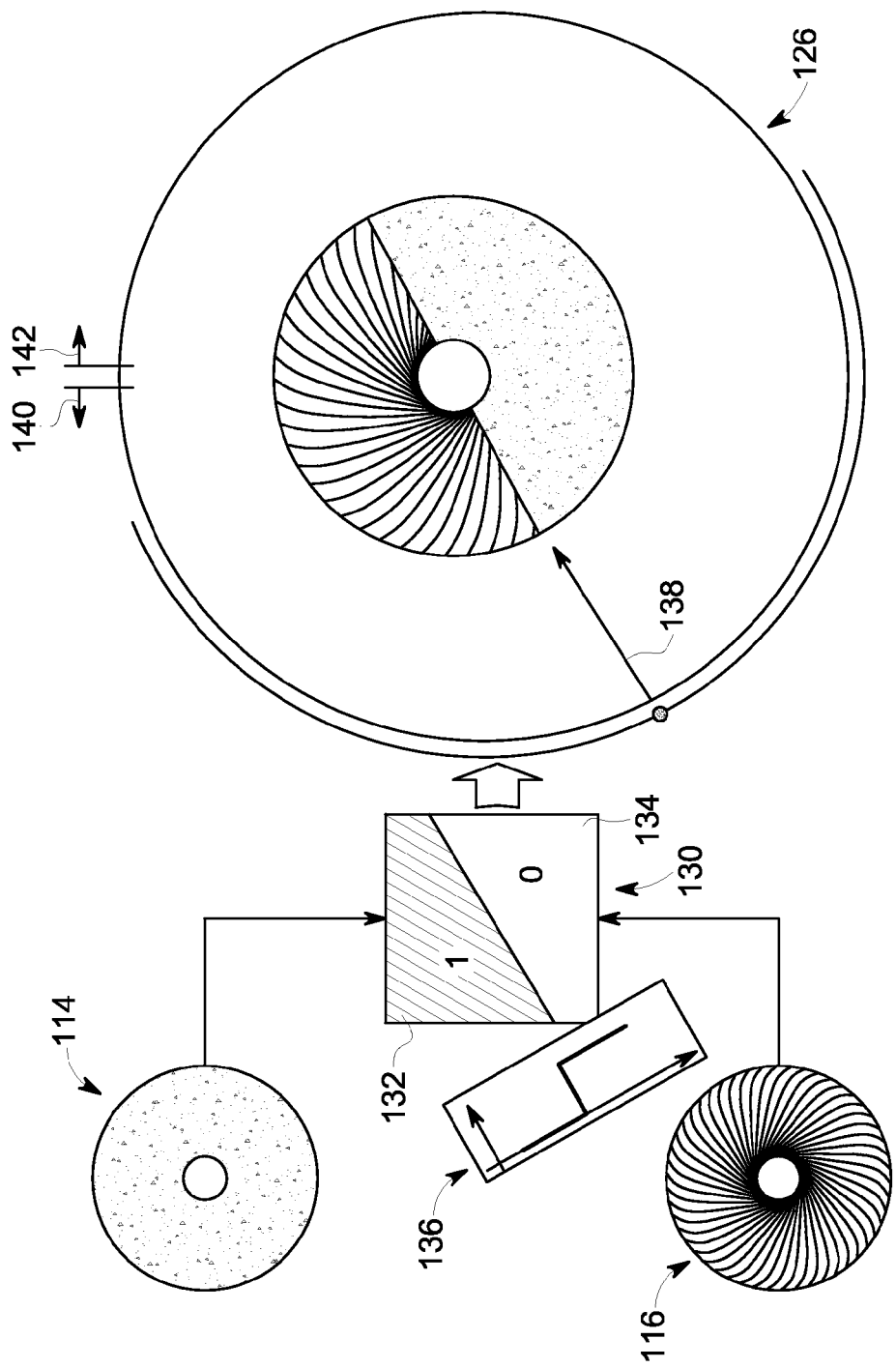
FIG. 7 depicts a graphical representation of the combination of two half-ramp reconstructions for a first center-view location in accordance with aspects of the present disclosure.
Figure 8:
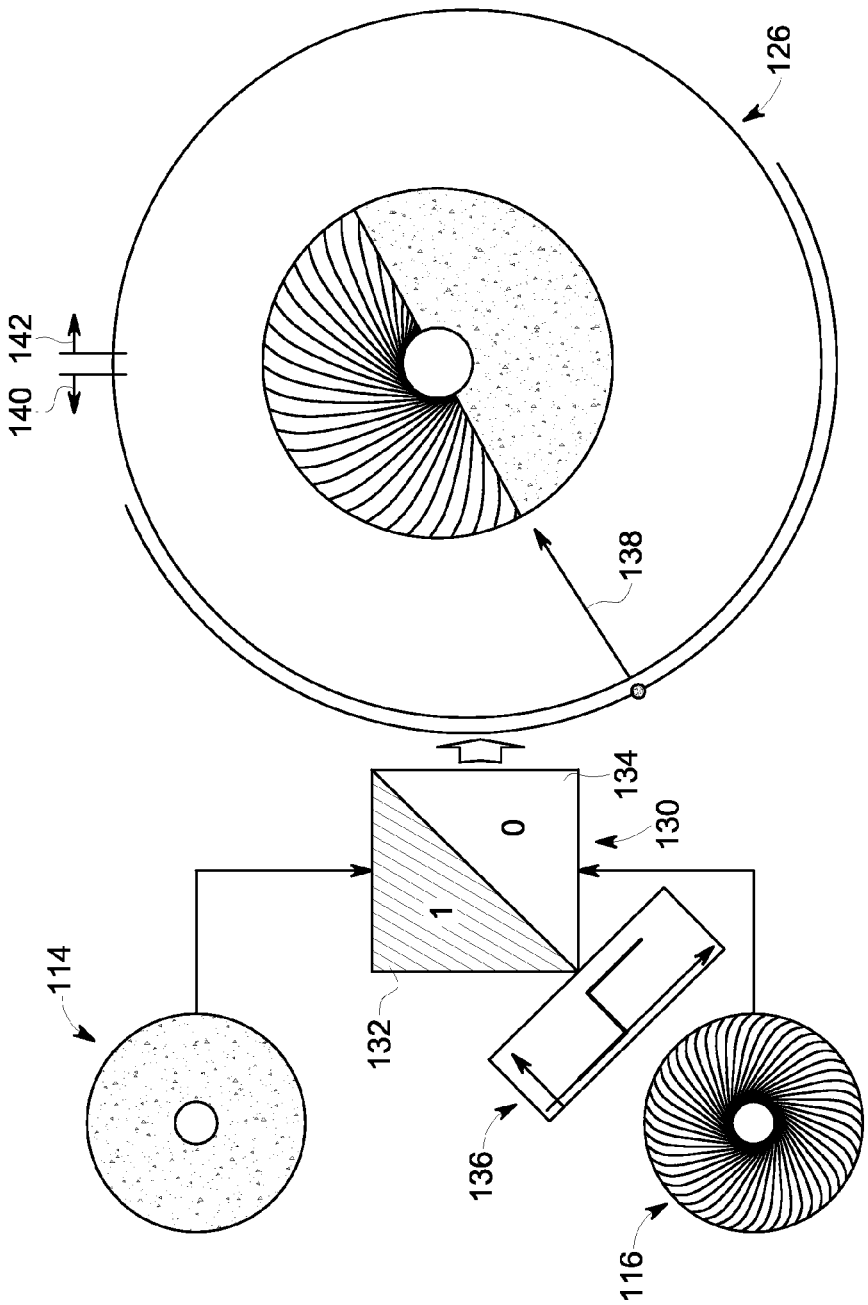
FIG. 8 depicts a graphical representation of the combination of two half-ramp reconstructions for a second center-view location in accordance with aspects of the present disclosure.

As noted above, in a full-scan implementation projection data may still be incomplete for some regions of the scan volume due to the regions only being illuminated partially during the scan due to the limited z-coverage of the detector 22. This relative data-incompleteness may result in truncation artifacts. In certain embodiments, such data incompleteness may be addressed by modification of the above approach. For example, for regions of relative data incompleteness, these regions may be processed in accordance with equation (9), as discussed above, but with the additional step of modifying the direction of the Hilbert transform to:

$$\Theta(x) = (-x_2, x_1, 0)^T \quad (10)$$

where $x = (x_1, x_2, x_3)^T$ is the reconstruction point. Thus, the center view is aligned with each voxel, as shown in FIGS. 7 and 8. In the above implementations, the Hilbert transform is invariant under scaling of $\Theta$.

Turning to FIGS. 7 and 8, one such implementation is shown. In this example, FIG. 7 depicts a first half-ramp image 114 and a second half-ramp image 116 in Fourier space. In the present example, a filter 130 is applied in Fourier space to address truncated views present in regions of the image data. In particular examples, a Hilbert filter operation can be implemented in Euclidean space or in Fourier space. In effect the filter 130 has two regions (depicted as shaded region 132 and unshaded region 134) that effectively weight the respective half-ramp images 114, 116 respectively by 0 or 1 in Fourier space (as depicted by the accompanying function 136 accompanying the filter 130). In the depicted example, this weighted combination process effectively shifts the center view 138 (relative to start view 140 and end view 142) based on voxel location in the resulting final image 126. In such an implementation, the shifted center view 138 allows a region of relatively incomplete image data to be reconstructed using the available limited data, thereby addressing the data truncation issue. Similarly, FIG. 8 depicts another voxel location having a different degree of data completeness. In this example, a different filter 130 may be employed, yielding a different center view 138 in the final reconstruction 126 and addressing different data truncation issues for the voxel location in question.

Figure 9:
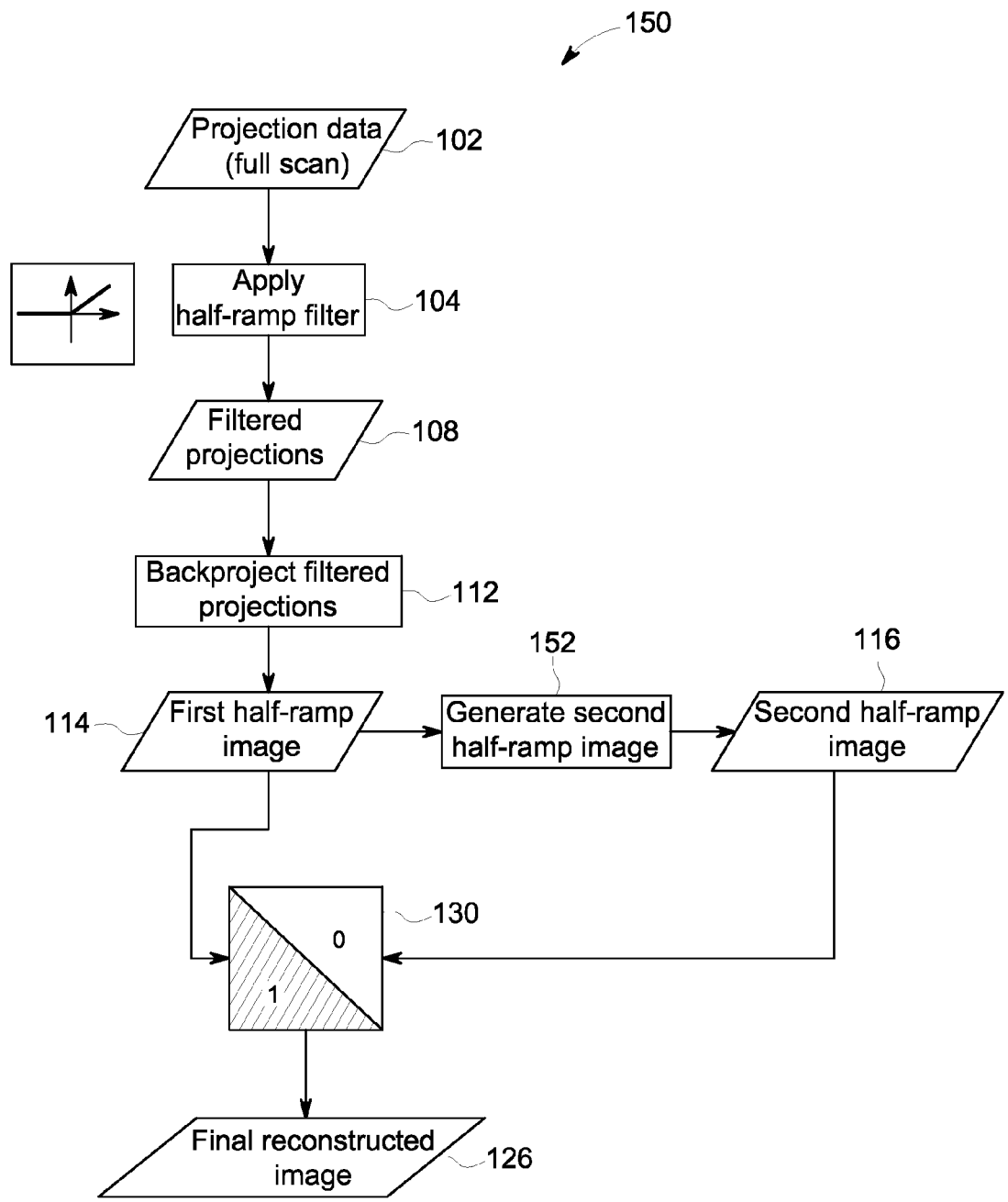
FIG. 9 depicts a flowchart of algorithmic steps for reconstructing a full-scan of projection data in accordance with further aspects of the present disclosure.

In addition to the implementations noted above, the present approach can also be implemented in other computationally efficient and equivalent manners. For example, turning to FIG. 9, a flowchart 150 depicts an alternative implementation. In this implementation the full-scan projection data 102 is half-ramp filtered (block 104) to generate one set of filtered projections 108. In one such implementation, the projection data 102 are real numbers, but, due to the application of the half-ramp filter, the filtered projections 108 are complex numbers (i.e., have real and imaginary components). The filtered projections 108 may be backprojected (block 112) to generate the first half-ramp image 114. The second half-ramp image 116 is not generated by directly half-ramp filtering the projection data 102 with a complementary half-ramp filter. Instead, the second half-ramp image 116 is generated (block 152), in one example, by determining the conjugate of first half-ramp image 114. For instance, in one implementation the second half-ramp image 116 is determined by calculating the difference between an image reconstructed from the real number projection data and an image reconstructed from the imaginary number projection data. The first half-ramp image 114 and the second half-ramp image 116 may then be used to synthesize the final reconstructed image 126. An example of this implementation is given by the equation:

$$f_d = \frac{1}{2}(I + iH_\Theta)P * \Lambda_R g + \frac{1}{2}(I - iH_\Theta)P * \Lambda_L g. \quad (11)$$

Figure 10:
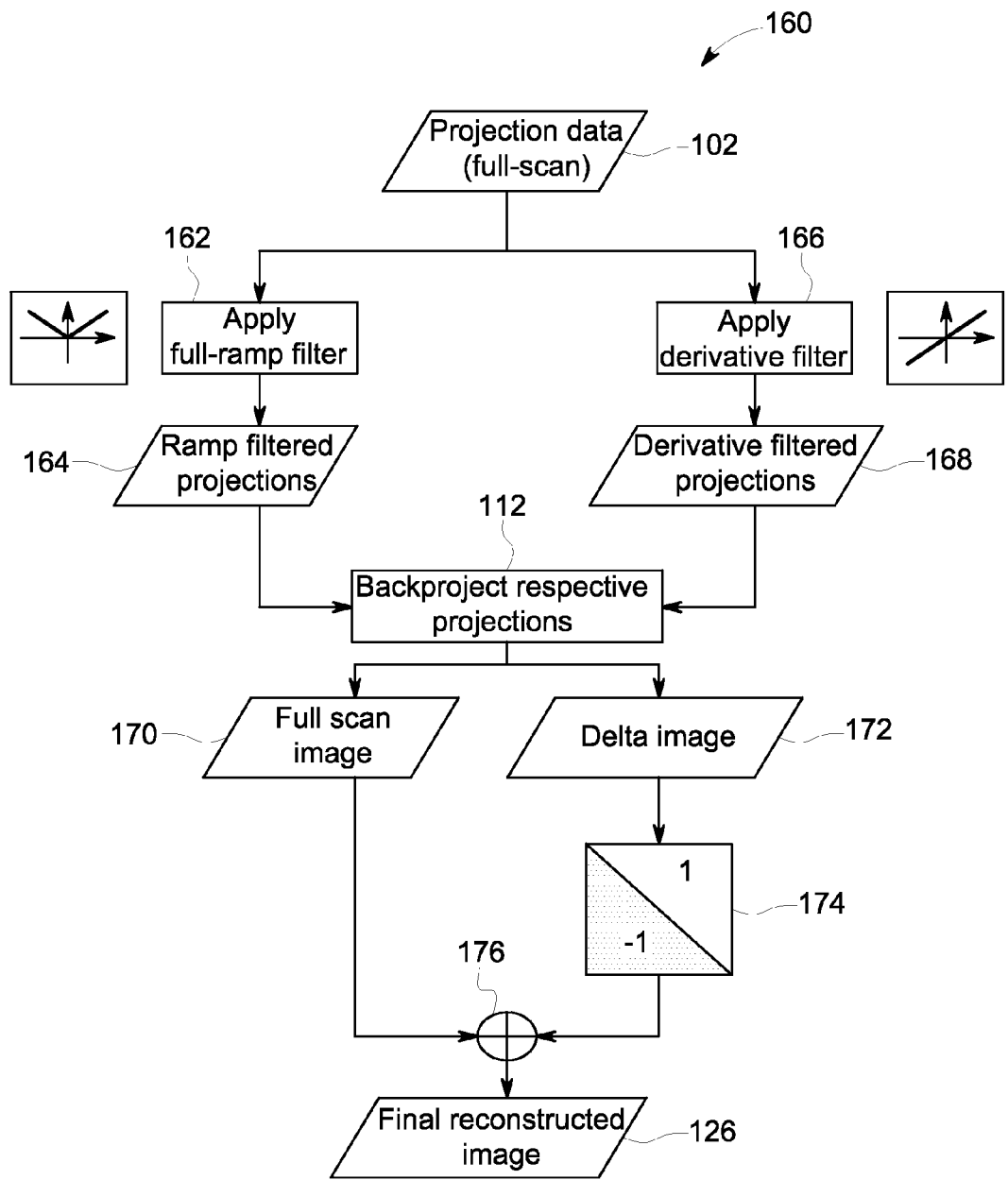
FIG. 10 depicts a flowchart of algorithmic steps for reconstructing a full-scan of projection data in accordance with additional aspects of the present disclosure.

Turning to FIG. 10, in an alternative implementation (depicted by flowchart 160) the half-ramp filter may be decomposed into computationally equivalent components, such as a full-ramp filter and a derivative. For example, in this implementation the projection data 102 (composes of real number data) may be processed (block 162) by a full-ramp filter to generate ramp-filtered projections 164 (composed of real number data) and a derivative filter (block 166) to generate derivative filtered projections 168 (composed of imaginary number data). The ramp-filtered projections 164 may be reconstructed to form a full-scan image 170 while the derivative filtered projections are reconstructed to generate a delta image 172. For static imaged regions or objects, the delta image 172 may be zero, however for moving objects or regions the delta image will have some non-zero value. The delta image 172 may be Fourier processed (such as by implementation of filter 174) and the extracted frequencies combined (block 176) with the full-scan image 170 to generate the final reconstructed image 126. An example of this implementation is given by the equation:

$$f_d = \frac{1}{2}[P * \Lambda - H_\Theta P * \partial]g. \quad (12)$$

Turning to FIG. 11, this figure provides a graphical description of the above full-ramp filter and derivative implementation. In particular, FIG. 11 graphically depicts the frequency space weights of the above implementation for $x_3$, $\xi_3 > 0$. In this example, $\phi_0 = 0$, where $\phi_0$ is the center-view, and the frequency space weights shown are based on a motion-free object. As depicted, all of the information from the 180 degrees around the center view is used (top row, right column of FIG. 11), while the remainder of the data is only used to fill the remaining frequency space (middle row, right column of FIG. 11).

Figure 12:
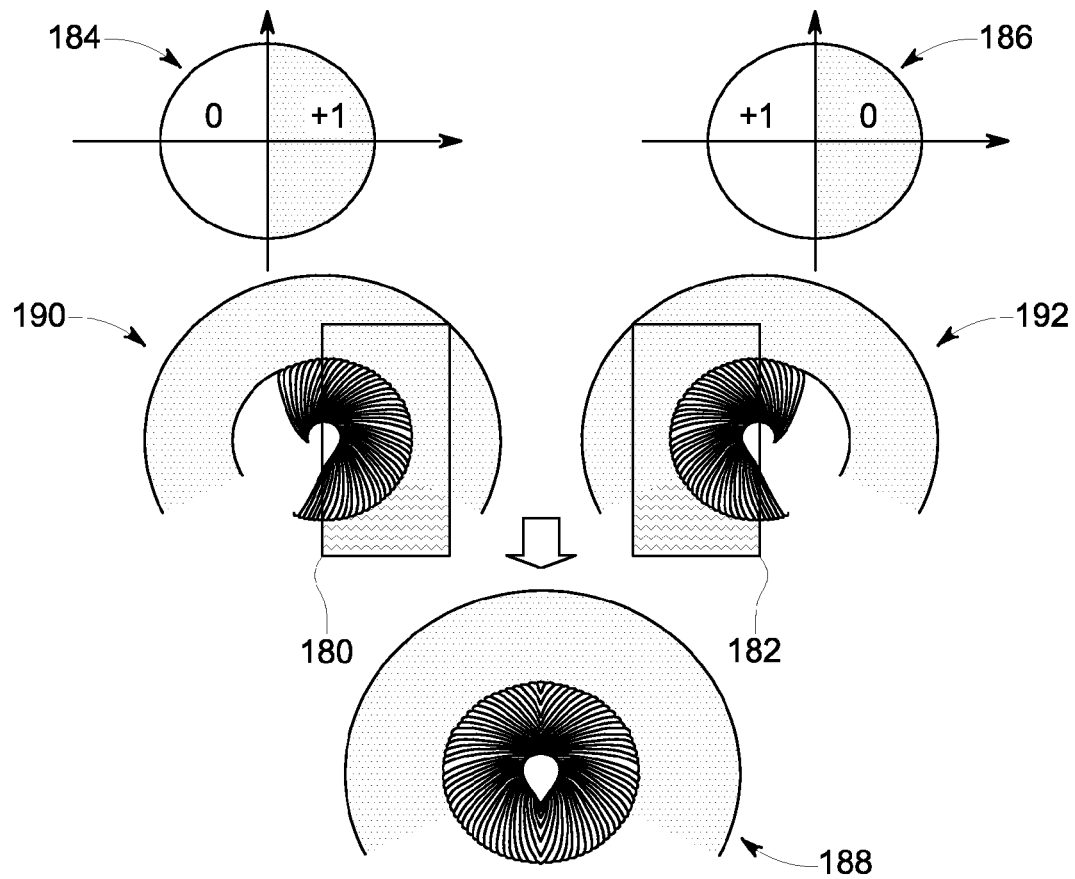
FIG. 12 depicts Fourier weighting achieved in accordance with a half-ramp reconstruction with respect to a half-scan of cone-beam projection data, in accordance with aspects of the present disclosure.

While the preceding describes implementations in which a full-scan of cone-beam projection data is acquired and processed, in alternative approaches, less than a full-scan but at least a half-scan (i.e., 180°+α) of cone-beam projection data is acquired. In accordance with the present approach, correct weighting is achieved in Fourier space by selecting half of the frequency range (denoted by blocks 180, 182) in each half-ramp filtered image 190, 192, as depicted in FIG. 12. Instead of having non-zero values on both sides of frequency space, the depicted half-ramp approach uses non-zero weighting on one side (i.e., 0 or +1). For example, in the depicted implementation, by applying a half-ramp filter (i.e., first half ramp filter 184, second half-ramp filter 186) in the projection domain, a specific weighting pattern is achieved after backprojection (i.e., half-ramp filtered images 190, 192). By combining the half-ramp filtered images 190, 192, a uniform sampling of the entire Fourier space may be achieved, as depicted by final reconstructed image 188. In one implementation, this is achieved by performing another half-ramp filtration on the half-ramp filtered images 190, 192, resulting in one uniformly weighted final reconstruction 188.

By way of further example, three implementations are discussed in greater detail. In the first implementation, reference is made to flowchart 200 of FIG. 13. Turning to this figure, a half-ramp filtration (block 202) is performed on a set of half-scan projection data 204, which results in complex numbers (i.e., numbers which have a real and an imaginary component). In the depicted example, the filtered projections 208 corresponding to the imaginary number components are computed or separated (block 210) from the filtered projections 206 corresponding to the real number components. Since the backprojector is linear, the real and imaginary filtered projections 206, 208 can be backprojected separately, such as to generate respective first half-ramp image 214 and second half-ramp image 216. Each reconstructed z-slice may then undergoes another half-ramp filtration process (blocks 220, 222), one for each half of frequency space (either as a convolution or after a 1D Fourier transform or after a 2D Fourier transform), to generate respective third half-ramp image 224 and fourth half-ramp image 226. Optionally, this frequency masking can also include some feathering instead of using a binary/feathered masking. The two images 224, 226 are combined (block 230) together to achieve a final reconstruction 232 with uniform frequency weighting.

Figure 14:
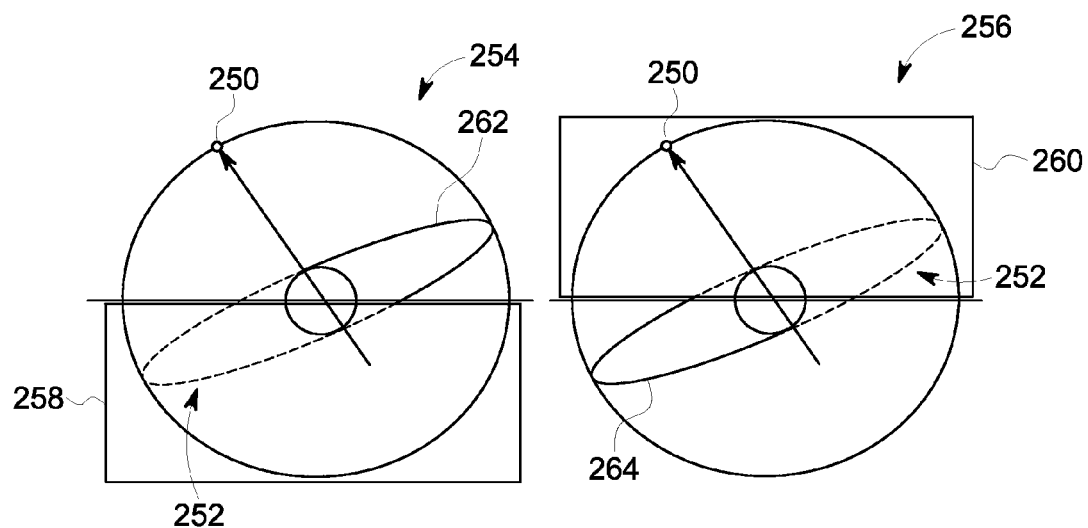
FIG. 14 depicts a graphical representation of an image domain frequency selection process in accordance with aspects of the present disclosure.

In another implementation, a shift-variant filtration is applied to the projection data to achieve the zeroing out of the redundant frequencies directly, as opposed to the two-step approach of the above example. In this implementation, several filtration lines are employed to select the correct frequencies. For example, turning to FIG. 14, source point 250 represents the source position for one particular view. The dashed elliptical circle 252 represents the frequencies corresponding to that one view. In one implementation, of the present half-ramp approach, the positive and negative frequencies are first split for each projection 254, 256 and half of Fourier space for each is selected (denoted by boxes 258, 260). This is shown schematically in FIG. 14 by the solid segments 262, 264. Thus, FIG. 14 depicts an image domain frequency selection process.

Figure 15:
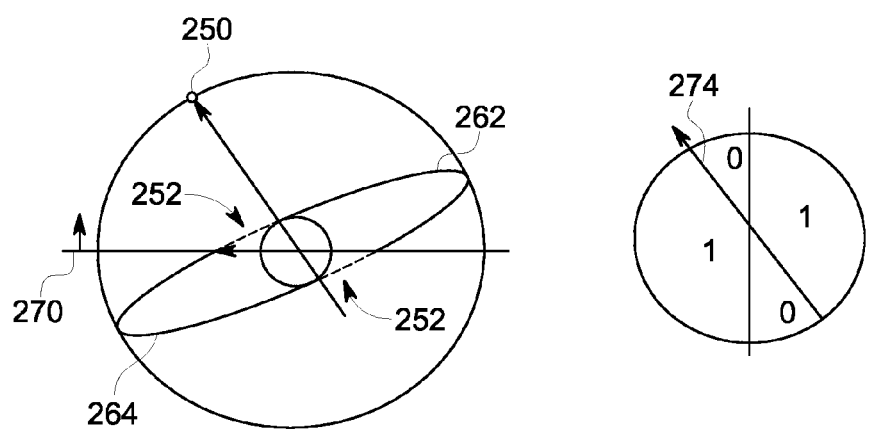
FIG. 15 depicts a graphical representation of a projection domain frequency selection process in accordance with aspects of the present disclosure.

In a further implementation, depicted in FIG. 15, a projection domain frequency selection process may instead be employed. For example, by applying ACE type filtering, both solid segments 262, 264 may be directly selected and the small segment in between may be eliminated. As depicted in FIG. 15, the central view plane 270 and source point location 250 define the end points of the arc segments 262, 264.

Figure 16:
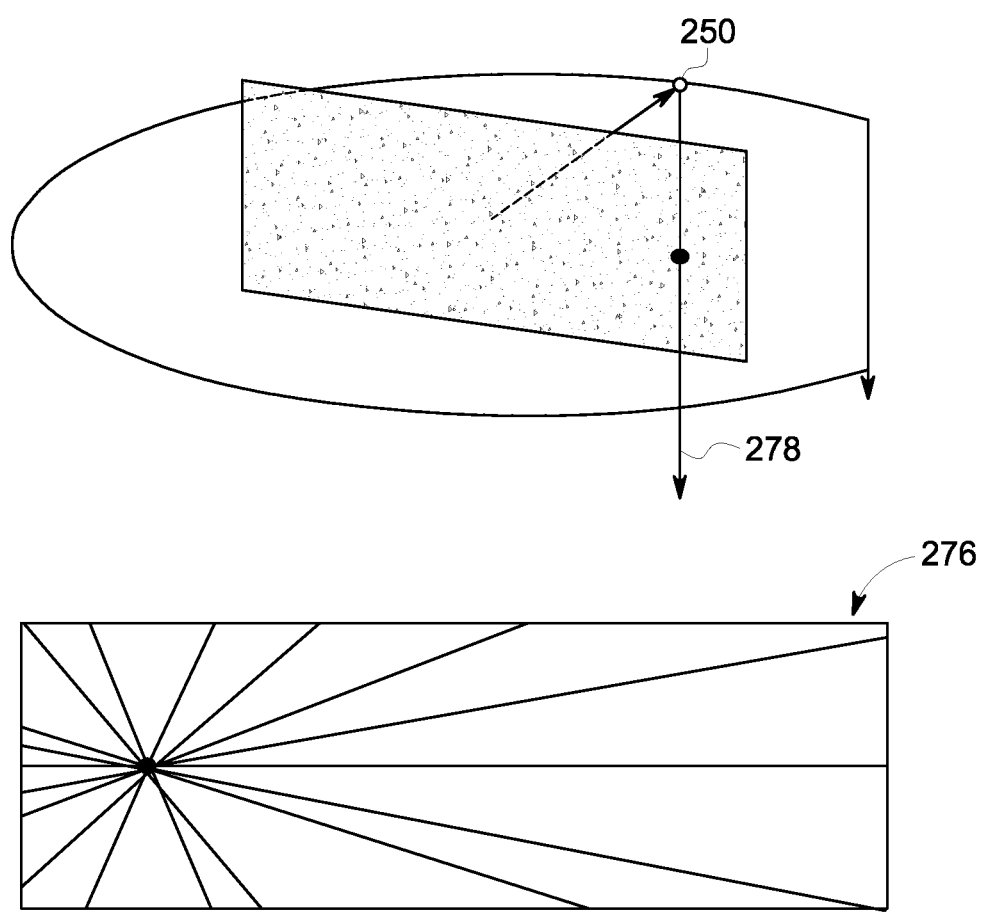
FIG. 16 depicts derivation of filtration directions for use in projection domain frequency selection in accordance with aspects of the present disclosure.

One example of how projection domain frequency selection, as depicted in FIG. 15, may be translated to specific filtering directions on the detector is shown schematically in FIG. 16. For example, the filtration direction can be derived as follows.

For any view position, given a ray coming from the source point 250, its filtration direction 276 (filtration plan) is defined by the orange vector 274 shown in FIG. 15, which is the intersection between the Fourier plane and the center view plane 270. Therefore, all the orange vectors 274 from different rays are perpendicular to the norm of the central view plane 270. As all the filtration planes contain the source point 250, all the filtration planes must intersect in a line 278 (FIG. 16), which is along the center view vector and contains the current viewpoint. Therefore, on the detector plane, all the filtration lines much cross a point, which is the intersection between line 278 and the detector plane. The filtration derived in this manner may then be used in accordance with the implementation depicted in FIG. 15 to achieve the weighting associated with the projection domain frequency selection process.

With respect to the third implementation, reference is first made to the first half-scan implementation discussed above. In that implementation, each half-ramp reconstruction undergoes a "zeroing out" of half of its data in the Fourier domain. In particular, the half-ramp reconstruction images are not limited to a finite support (in the spatial domain). Therefore, only a finite region can be reconstructed. As a result, the FFT will have some errors compared to the true Fourier transform, which may cause artifacts in the final reconstruction. However, the error in Fourier domain is expected to be mainly in the region where the two half Fourier planes are merged.

Figure 13:
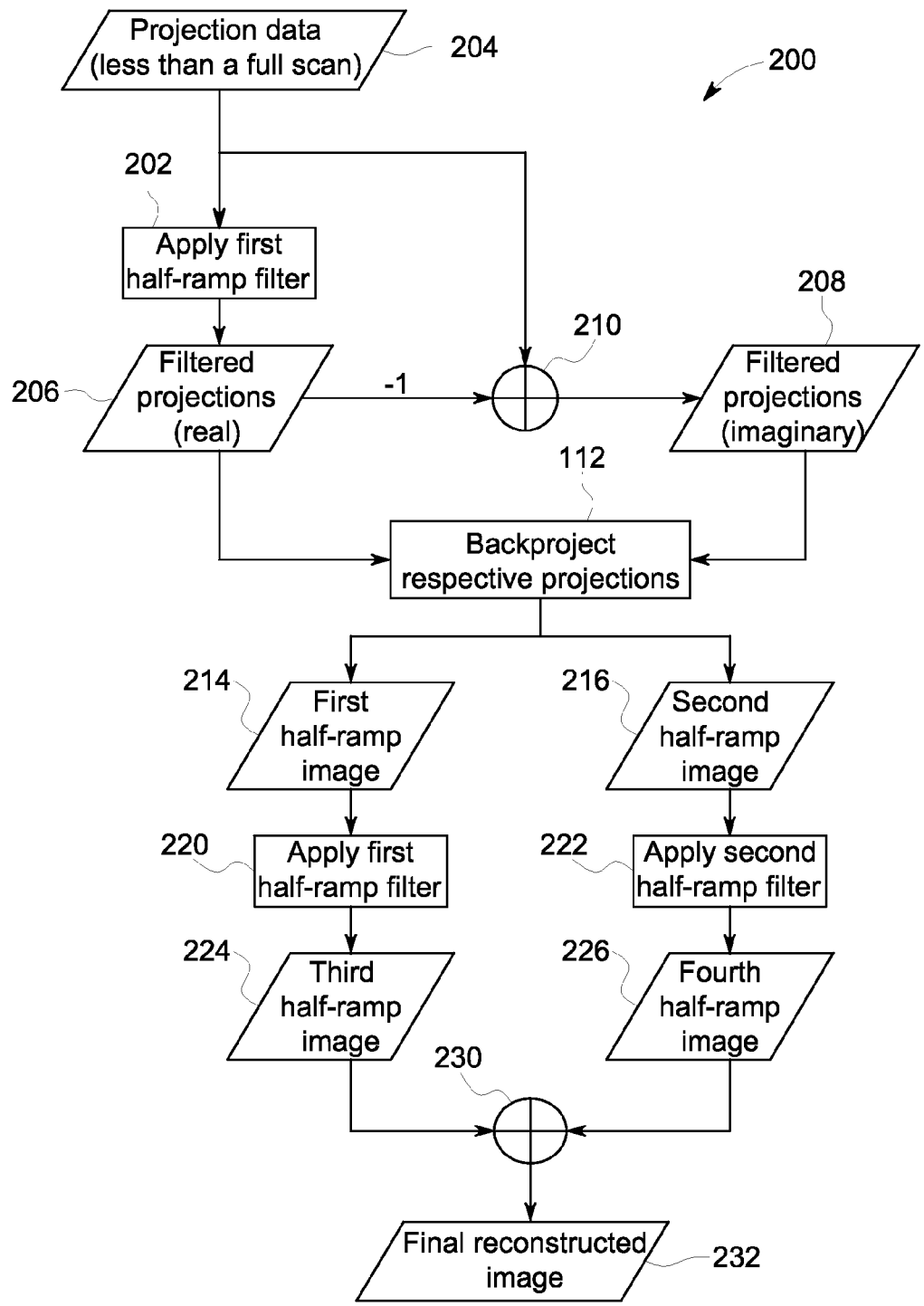
FIG. 13 depicts a flowchart of algorithmic steps for reconstructing less than a full-scan of projection data in accordance with aspects of the present disclosure.
Figure 17:
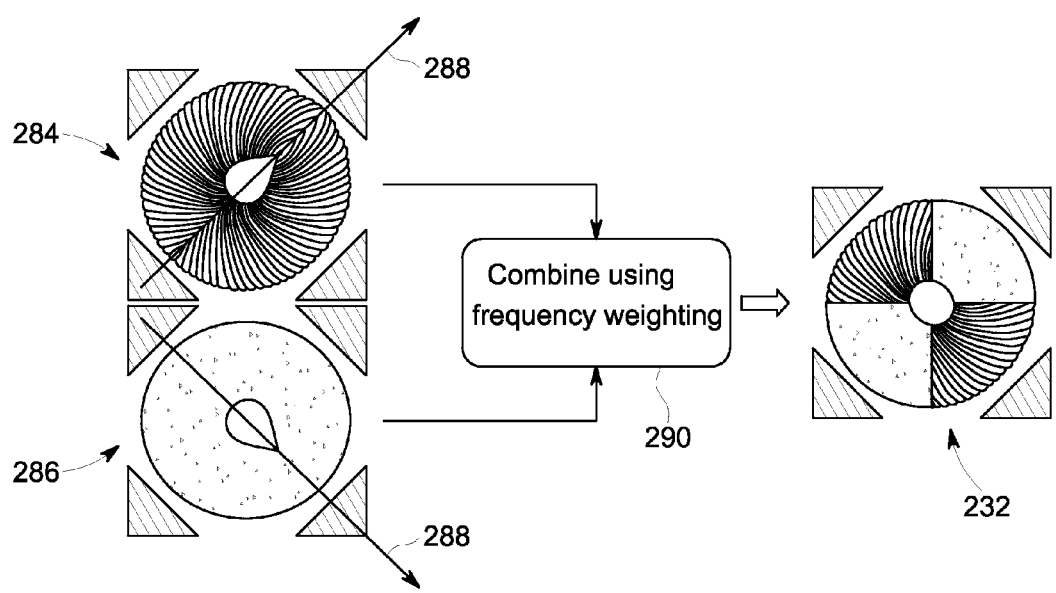
FIG. 17 depicts a graphical representation of the combination of two angularly offset, less than a full-scan, half-ramp reconstructions in accordance with aspects of the present disclosure.

With this in mind, and with respect to the third implementation, if the view interval is large enough, two shifted-reconstructions 284, 286 (i.e., reconstructions with a shifted or different center view) may be generated using the half-ramp approach discussed with respect to FIGS. 12 and 13. Turning to FIG. 17, each of the shifted reconstructions 284, 286 will have corrupted frequencies along a different direction (denoted by arrow 288) in Fourier space. The shifted reconstructions 284, 286 may then be combined (block 290) using an appropriate frequency weighting, i.e., avoiding the regions with corrupted frequencies. Thus, in accordance with this implementation, a weighted combination of two reconstructions from two angularly shifted view intervals is performed. The same principles can be applied to the second half-scan implementation discussed above with respect to FIGS. 14-16.

One advantage of the combination of the two, angularly offset reconstructions with respect to either of the preceding implementations is that use of the angularly offset reconstructions may make the process more robust against motion artifacts. For example, in the presence of motion there are some discontinuities or inconsistencies in the Fourier domain where segments originating from different projections are merged (along the vectors 288 in FIG. 17). These may cause some artifacts along the corresponding direction. By performing two independent half-ramp reconstructions and merging them together with the suitable weighting, those streaks may be reduced.

Technical effects of embodiments of the invention include using half-ramp filters to generate image reconstructions using projection data acquired by full-scans or half-scans of a cone-beam imaging system. Other technical effects include generating and using half-ramp reconstructions of cone-beam projection data to recover missing frequencies in frequency space to allow for correction of certain types of image artifacts, such as cone-beam artifacts.

This written description uses examples to disclose embodiments of the invention, including the best mode, and also to enable any person skilled in the art to practice the invention, including making and using any devices or systems and performing any incorporated methods. The patentable scope of embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of tomographic image reconstruction comprising:
   applying a first half-ramp filter to a set of full-scan cone-beam projection data to generate a first set of filtered projections, wherein the first half-ramp filter is non-linear and applies a zero-weighting to values on a first side of a threshold and applies a non-zero weighting to values on a second side of the threshold;
   backprojecting the first set of filtered projections to generate a first half-ramp image;
   generating a second half-ramp image by determining the conjugate of the first half-ramp image;
   extracting complementary frequency data from the first half-ramp image and the second half-ramp image; and
   generating a reconstructed image using the extracted complementary frequency data.

2. The method of claim 1, wherein the second half-ramp image is generated by:
   applying a second half-ramp filter to the set of full-scan projection data to generate a second set of filtered projections, wherein the second half-ramp filter is complementary to the first half-ramp filter; and
   backprojecting the second set of filtered projections to generate the second half-ramp image.

3. The method of claim 1, wherein extracting the complementary frequency data is accomplished by two-dimensional fast Fourier transform.

4. The method of claim 1, wherein the acts of extracting complementary frequency data and generating the reconstructed image are accomplished using one or more filtering operations.

5. The method of claim 1, wherein the reconstructed image has a center view specified by an operator.

6. The method of claim 1, wherein the reconstructed image has a half-scan temporal resolution.

7. An image processing system, comprising:
   a memory storing one or more routines; and
   a processing component configured to execute the one or more routines stored in the memory, wherein the one or more routines, when executed by the processing component:
      apply a first half-ramp filter to a set of full-scan cone-beam projection data to generate a first set of filtered projections, wherein the first half-ramp filter is non-linear and applies a zero-weighting to values on a first side of a threshold and applies a non-zero weighting to values on a second side of the threshold;
      backprojecting the first set of filtered projections to generate a first half-ramp image;

generate a second half-ramp image by determining the conjugate of the first half-ramp image;

extract complementary frequency data from the first half-ramp image and the second half-ramp image; and generate a reconstructed image using the extracted complementary frequency data.

8. The image processing system of claim 7, wherein the second half-ramp image is generated by routines which, when executed by the processing component:

apply a second half-ramp filter to the set of full-scan projection data to generate a second set of filtered projections, wherein the second half-ramp filter is complementary to the first half-ramp filter; and backproject the second set of filtered projections to generate the second half-ramp image.

9. The image processing system of claim 7, wherein the acts of extracting complementary frequency data and generating the reconstructed image are accomplished using one or more filtering operations.

10. The image processing system of claim 7, wherein the reconstructed image has a half-scan temporal resolution.

11. The image processing system of claim 7, wherein the reconstructed image has a center view specified by an operator.

12. One or more non-transitory computer-readable media, encoding one or more routines which, when executed by a processor, cause the processor to perform acts comprising:

applying a first half-ramp filter to a set of full-scan conebeam projection data to generate a first set of filtered projections, wherein the first half-ramp filter is nonlinear and applies a zero-weighting to values on a first side of a threshold and applies a non-zero weighting to values on a second side of the threshold;

backprojecting the first set of filtered projections to generate a first half-ramp image;

generating a second half-ramp image by determining the conjugate of the first half-ramp image;

extracting complementary frequency data from the first half-ramp image and the second half-ramp image; and generating a reconstructed image using the extracted complementary frequency data.

13. The one or more non-transitory computer-readable media of claim 12, wherein the second half-ramp image is generated by routines which, when executed by the processor, cause the processor to perform acts comprising:

applying a second half-ramp filter to the set of full-scan projection data to generate a second set of filtered projections, wherein the second half-ramp filter is complementary to the first half-ramp filter; and backprojecting the second set of filtered projections to generate the second half-ramp image.

14. The one or more non-transitory computer-readable media of claim 12, wherein the acts of extracting complementary frequency data and generating the reconstructed image are accomplished using one or more filtering operations.

15. The one or more non-transitory computer-readable media of claim 12, wherein the reconstructed image has a half-scan temporal resolution.

16. The one or more non-transitory computer-readable media of claim 12, wherein the reconstructed image has a center view specified by an operator.

* * * * *